3,476,663
PROCESS FOR DERIVING PRECIOUS METAL
VALUES FROM SEA WATER ENVIRONMENTS
Edward O. Norris, 9 Ledgemoor Lane,
Westport, Conn. 06880
Continuation-in-part of application Ser. No. 644,515,
June 8, 1967. This application Mar. 27, 1968, Ser.
No. 716,407
Int. Cl. C02b 1/34; B01k 3/00
U.S. Cl. 204—151         16 Claims

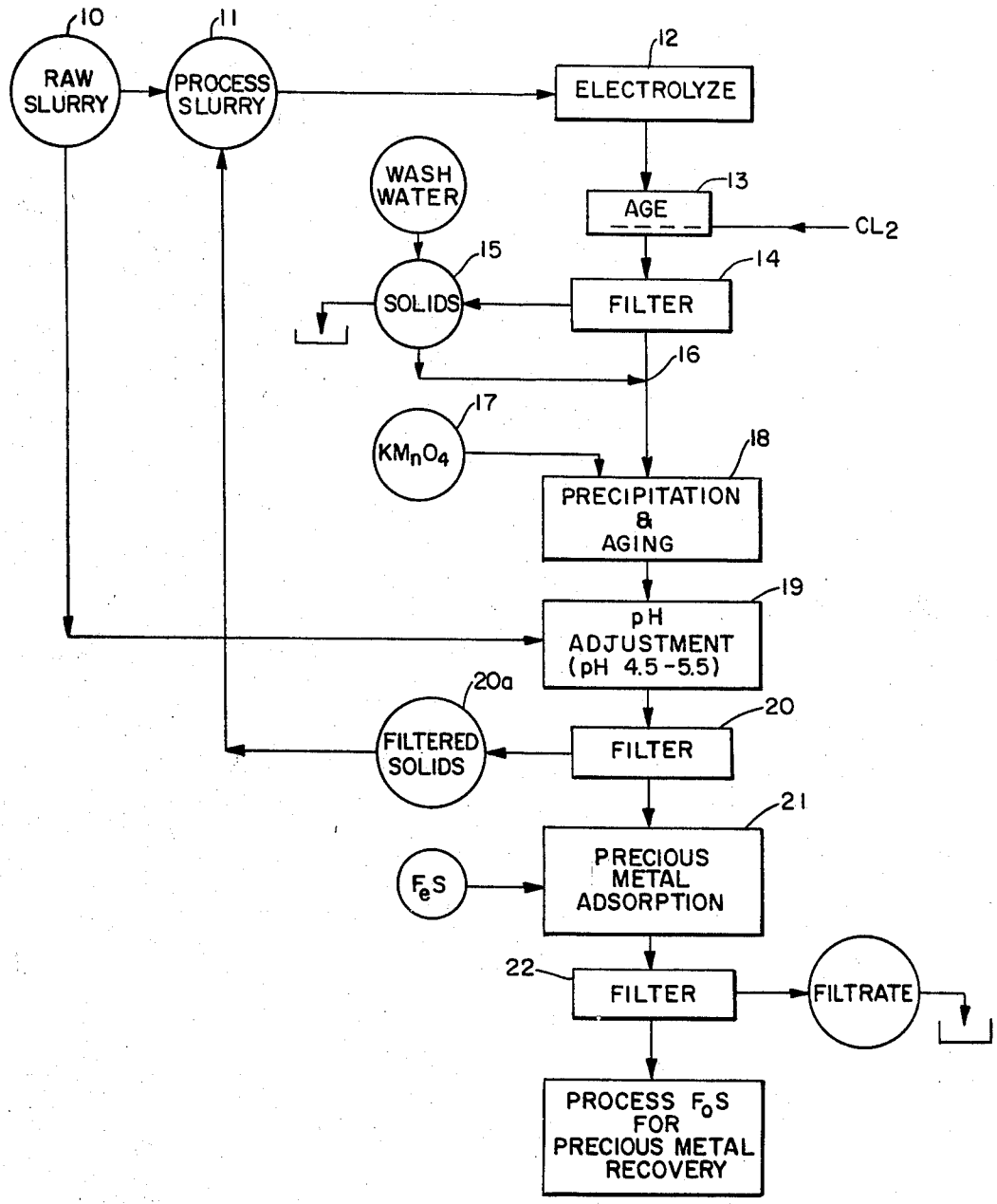

ABSTRACT OF THE DISCLOSURE

The invention is directed to the recovery of precious metals, such as gold, silver and platinum, from sea water environments, particularly by extraction of precious metal compounds from sea bottom sediments and/or sea water near or associated with such sediments. The process of the invention is directed particularly to improvements in extraction procedures, providing for improved efficiency and reliability in the separation of precious metals in their elemental forms from various related "interfering" substances.

RELATED APPLICATIONS

The present application is a continuation-in-part of my earlier parent application Ser. No. 644,515, filed June 8, 1967, and entitled "Recovery of Metal Values From Sea Water Environments," and the entire disclosure of such application may be considered as being incorporated herein by reference. The present application also is collaterally related to my copending application Ser. No. 628,458, filed Apr. 4, 1967, and entitled "Method and Means for Recovering Metals From Sea Water."

BACKGROUND AND SUMMARY OF INVENTION

In my prior application Ser. No. 644,515, I have disclosed an advantageous procedure for deriving precious metal values from sea water environments. This procedure involves, as an initial processing stage, the derivation of sea water solutions which are highly enriched in their content of dissolved or suspended precious metal compounds. In certain special circumstances, the enriched sea water solution may be derived by direct extraction of naturally enriched waters from selected environments. More typically, however, it is desirable and advantageous to effect an induced enrichment of the sea water solution. My prior application Ser. No. 644,515 deals with, among other things, techniques for effecting such induced enrichment.

One of the particularly advantageous procedures for inducing enrichment of sea water solutions is to effect a disturbance of sediment fines, often but not always found in the uppermost strata (e.g., typically two or three inches) of the sea bottom sediments, and intermixing and treating such fines in a sea water solution, under conditions which permit dissolving or suspending in the sea water the content of precious metal compounds, found in or associated with the fines. In accordance with the techniques described in my prior application Ser. No. 644,515, a slurry of agitated sediment fines and sea water is extracted from a selected sea bottom area and is treated by one or more of a variety of processes, including aging under oxidizing conditions, aging with induced biochemical activity, electrolysis, etc., to bring about the desired enrichment of the sea water with the precious metal compounds associated with the sediment fines. To particular advantage, in many cases, enrichment is effected by treatment in the anode chamber of an electrolytic cell as set forth in detail in the parent application.

After enrichment of the sea water solution in accordance with my earlier inventions, the exhausted sediment fines can be separated and discarded, and the enriched solution is processed for derivation of the precious metal values, most advantageously by precipitating the precious metals as sulfide compounds and then processing the sulfide compounds by more or less conventional metallurgical chemistry to derive the elemental metals.

Important difficulties have been encountered in processing the metal compound-enriched sea water solution, to the point of deriving elemental precious metals, in that there seems to be intimately associated with the precious metal compounds some kind of complex inorganic-organic material. The exact nature of this complex material is not presently known and I will refer to it for the purposes of this disclosure simply as an "interfering" material. Normally, during the processing of the enriched sea water solution to form precipitates of precious metal compounds, the interfering material itself forms a virtually infusible precipitate. The presence of this interfering precipitate seriously interferes with the aggregation and collection of the elemental metals when the precipitated sulfides are crucibled or when the metal compounds are reduced in combustion "boats."

In my parent application, an advantageous technique is provided for eliminating the precipitated interfering substance by filtering off the combined precipitates of precious metal compounds and the interfering material and subsequently selectively redissolving the precious metal compounds and removing the insoluble interfering materials by filtration. Thereafter, the precious metal compounds are reprecipitated and treated by conventional chemical metallurgy to derive the elemental metals.

In accordance with the present invention, elimination of the interfering substance is achieved without requiring redissolving and reprecipitation of the precious metal compounds, whereby significant process economy, process simplification and process reliability is realized. In accordance with a specific aspect of the invention, an enriched sea water solution, while maintained at a pH well below that to which the interfering substance tends naturally to precipitate, is reacted with potassium permanganate ($KMnO_4$). This selectively precipitates the interfering substance out of the metal-enriched solution. After a period for aging of the precipitate and solution, the pH of the solution is raised and the precipitate is separated by filtration. The filtrate is then exposed to a material, such as activated ferrous sulfide precipitate, which effectively adsorbs the precious metal compounds, significantly free of the interfering substance. The thus charged sulfide precipitate is separated from the now-spent filtrate and processed in conventional ways for recovery of the elemental metal.

In a most advantageous procedure in accordance with the invention, a process slurry of sea water and sediment fines is treated in the anode chamber of an electrolytic cell. The treated process slurry, which has an extremely low pH (typically below 1) as a result of the electrolytic treatment, is then aged and filtered to remove the spent fines from the now-enriched process solution. The process solution, at an extremely low pH, is reacted with $KMnO_4$ for precipitation of the interfering substance, as above described. Thereafter, the pH of the process solution, with its contained precipitated interfering substance, is raised by the introduction of raw slurry of sediment fines and sea water. The raw slurry has a high pH level, and a sufficient quantity thereof is mixed with the reacted process solution to bring the pH of the mixture within the range of 4.5 to 5.5. Thereafter, the pH-adjusted process solution is filtered, and the filtered-off solids, consisting principally of unspent sediment fines is returned to the beginning of the process and forms part of the make-up of the process slurry initially supplied to the electrolytic cell.

The pH-adjusted filtration is exposed to the activated ferrous sulfide of the like for precious metal adsorption in the manner previously indicated.

For a better understanding of the above and to the advantageous aspects of the invention, reference should be made to the following detailed description and to the accompanying drawing.

DESCRIPTION OF THE DRAWING

The drawing is a simplified schematic flow sheet representation illustrating the sequence of steps involved in carrying out a preferred process according to the invention for the extraction of precious metal values from sea water environments.

DESCRIPTION OF A PREFERRED EMBODIMENT OF THE INVENTION

In a particularly advantageous precious metal recovery process according to the invention, the input material is a raw slurry of sea water and sediment fines extracted from selected sea bottom areas. Desirably, the sediment fines are of a metallo-organic material of very fine particle size which are often found in the upper strata of the sea bottom sediment and are generally quite easily distinguishable from the associated coarser, essentially inorganic materials in the nature of sand. Ordinarily, the desirable sediment fines are found in the upper two or three inches of sea bottom area, in regions in which the naturally occurring conditions favor biochemical concentration of precious metal compounds from the waters of the sea.

As set forth in my parent application Ser. No. 644,515, a slurry of sea water and sediment fines advantageously is derived by disturbing the sediment fines and withdrawing, as through a suction pipe, a mixture of the fines and water derived from regions immediately adjacent thereto. Desirably, the raw slurry may comprise as much as 50% or more of the sediment fines.

In accordance with my prior discoveries, the raw slurry is treated or processed to break down the desired metallo-organic compounds of the sediment fines and cause them to become dissolved or suspended in the sea water solution. Infrequently, this can be accomplished by permitting the slurry to age for a period of time under natural or artificial sunlight. More typically, a more active treatment is required, such as the introduction of certain biochemical organisms, inducing oxidizing conditions as by contacting the aging slurry with chlorine gas, or electrolytic breakdown. Most advantageously, in the procedure of the present invention, the slurry is electrolytically treated in the anode chamber of an electrolytic cell, as described in detail in my parent application Ser. No. 644,515.

As indicated in the drawing, and as will be explained more fully, the raw slurry, indicated at 10, is mixed with a proportion of processed solids, recycled from a subsequent stage of the recovery process, to form a process slurry indicated at 11. Typically, the raw slurry is a high pH material, and the recycled solids are of a somewhat lower pH, so that the process slurry is at a somewhat lower pH than the raw slurry, which is a desirable condition.

The process slurry 11 is directed into the anode chamber of an electrolytic cell designated at 12, where it is subjected to an electrolytic treatment while being contacted with oxidizing gases such as chlorine. During the electrolytic treatment the process material in the anode chamber becomes increasingly lower in pH, while the material in the cathode chamber becomes increasingly alkaline. Desirably, the cathode chamber is continuously flushed with sea water to avoid excess alkalinity.

After full electrolytic treatment, the process slurry, now at a very low pH, typically below 1, may be directed to an aging vessel indicated at 13, where the slurry is further aged and contacted with an oxidizing gas, such as chlorine gas evolved from the anode chamber of the electrolytic cell. After a reasonable aging period, the sought-for metal compound of the sediment fines are substantially dissolved or suspended in the sea water solution, and the slurry is passed through a centrifuge or filter, designated at 14, to separate the solution from the solid fines. The spent solids, indicated at 15, are washed and discarded and the wash water is added to the effluent from the filter 14, as indicated at 16.

In accordance with an important aspect of the invention, the enriched process solution, comprised at this stage of filter effluent and wash water at an extremely low pH (i.e., typically less than 1) is reacted with an extremely active oxidizing agent, such as potassium permanganate ($KMnO_4$). Desirably, this is accomplished by first dissolving $KMnO_4$ crystals in water, indicated at 17, and adding the $KMnO_4$ solution to the enriched process solution, as indicated at 18. Desirably as much $KMnO_4$ is introduced as can be reacted by the process solution. The reaction is readily observable by the initially purple $KMnO_4$ turning to a brown color as it is reduced by the process solution. Substantial completion of the reaction is indicated when further additions of the $KMnO_4$ do not change color.

Reacting of the process solution with $KMnO_4$ results in immediate and selective precipitation of an "interfering" substance, which, otherwise introduces serious difficulties in the ultimate extraction of elemental precious metals from the process solution. In this respect, I have found that the interfering substance will precipitate spontaneously if the process solution is raised to a certain pH level, usually in the range of about 4.5 to 5.5. However, such spontaneous precipitation is especially undesirable because, among other reasons, of the tendency for the spontaneous precipitate to extract some of the precious metal content from the process solution, resulting in significant losses in overall process efficiencies.

In many cases, it is desirable to age the reacted process solution for a period. An aging period of around twenty-four hours seems to be adequate in such cases. During such an aging period the precipitated interfering material will be observed to assume a somewhat yellow coloration.

After the selective precipitation of the interfering material by $KMnO_4$ reaction, a selectively adsorptive compound is introduced into the solution for controllably extracting the precious metal values from the solution by a process of adsorption. A most particularly advantageous material for this purpose is a precipitated ferrous sulfide compound, as will be further described.

After precipitation and aging of the interfering substance, the process solution typically is at a very low pH and is in any event at a pH below that at which spontaneous precipitation of the interfering substance tends to occur. At such low pH levels, the process solution would tend to dissolve the ferrous sulfide particles, so that the desired adsorptive actions could not occur. Accordingly, it is necessary to effect an upward pH adjustment of the process solution. In accordance with one of the specific aspects of the invention, upward adjustment of the process solution is effected by the introduction of raw slurry 10 into the low pH solution, as indicate at 19. Raw slurry, which is a relatively high pH material, is added in amounts sufficient to raise the pH of the overall mixture to around 4.5 to 5.5, which is a desirable level from the standpoint of avoiding dissolution of the ferrous sulfide particles and from the standpoint of selective adsorption of the desired precious metals.

The pH-adjusted mixture, still containing the precipitated interfering substance, is suitably filtered at 20, and the filtered solids 20a, comprising the sediment fines introduced at 19 and the interfering substance particles formed at 18, is returned and mixed with the incoming raw slurry 10 to provide the process slurry 11 constituting the feed to the electrolytic cell. The filtered-off sediment fines returned from the filter stage 20, thus are processed along with the raw slurry, as will be understood. The accompanying filtered-off, precipitated interfering substance is harmlessly recycled through the electrolytic process and is filtered-off and discarded at the filter stage 14 along with spent sediment fines.

After the pH-adjusted process material is filtered at 20, ferrous sulfide particels are added thereto at 21, and these particles will selectively adsorb the relatively more electronegative metallic elements, including gold, silver and platinum, from the process solution. When the adsoption capacity of the ferrous sulfide particles is fully exhausted, the particles are filtered off and processed in accordance with conventional chemical metallurgy for the recovery of the adsorbed metals in their elemental forms.

Most advantageously, the ferrous sulfide particles are prepared by reacting an aqueous solution of ferrous sulfate of ferrous chloride with a solution of sodium sulfide, to a pH of approximately 4.5 to 5.5. A black ferrous sulfide precipitate is formed and is allowed to settle, and the clear effluent is separated as by decantation. The thus prepared ferrous sulfide precipitate is introduced into the clear process solution at 21 and, typically, may extract the desired metal values from the process solution without exhausting its adsorption capacity. In such cases, the spent process liquid is decanted or filtered-off and discarded as at 22 and additional, enriched process solution is brought into contact with the still active ferrous sulfide particles until they are fully used up. The fully charged ferrous sulfide particles should be washed thoroughly with chloride-free water, preferably containing a little dissolved hydrogen sulfide. The charged particles are then dried, crushed and furnaced, and/or assayed.

While ferrous sulfide as above derived is considered most advantageous for use in the process because of its favorable settling and filtering properties, it is also possible to use ferrous sulfide formed by the thermal combustion of iron and sulphur. The sulfide should be crushed and, preferably, ballmilled, and should be activated by a short leach with dilute hydrochloric acid. Managanese sulfide and zinc sulfide also are useful as selective adsorbents for extraction of the precious metal elements from the process solution at 21.

The process of the invention is particularly advantageous, in that it provides for the highly selective precipitation and separation of "interfering" materials from the desirable precious metal compounds in the process solution. In addition to achieving highly selective precipitation of the interfering material, the process of the invention may be carried out on a highly economical basis and with simplicity and reliability suitable for commercial scale operations.

A key step in the process is the introduction of an extremely active oxidizing agent into the low pH process solution prior to treatment of the solution for selective adsorption of the precious metal content. $KMnO_4$ is indicated to be a uniquely satisfactory oxidizing agent for this purpose, but it is considered possible that other highly active oxidizing agents might be useable in the process.

Another advantageous aspect of the process, which is of practical significance in terms of process economies, is the use of raw slurry, rather than chemical reagents, for the required pH adjustment of the process solution. Thus, in the process of the invention, selective precipitation of the interfering substance is required to be carried out at relatively low pH, and subsequent selective adsorption of the precious metal content is required to be carried out at a higher pH. In accordance with one specific aspect of the invention, raw starting slurry, which is a relatively high pH material in its natural state, is introduced into the process solution solely for the purpose of raising its pH, and the sediment fines contained therein are immediately removed by filtration and are returned to be used as part of the process slurry.

It should be understood that the form of the invention specifically illustrated and described herein is intended to be representative only, as certain variations may be made therein without departing from the clear teachings of the disclosure. Accordingly, reference should be made to the following appended claims in determining the full scope of the invention.

I claim:
1. A process for deriving precious metals from sea bottom environments, which comprises,
    (a) extracting from the sea bottom environment a process solution of sea water enriched with precious metal compounds and an interfering material,
    (b) while maintaining the enriched process solution at a pH below that at which the interfering material spontaneously precipitates, treating said solution with a highly active oxidizing agent,
    (c) said treating step including a reaction between said interfering material and said oxidizing agent to form an insoluble reaction product,
    (d) separating the reaction product from the process solution, and
    (e) treating the separated process solution to derive precious metal compounds.

2. A process according to claim 1, further characterized by
    (a) said separated process solution being treated by exposure to a sulfide compound effective to adsorb more electronegative metal elements from said solution,
    (b) the pH of said solution being raised prior to said treatment but subsequent to said reacting.

3. A process according to claim 2, further characterized by
    (a) said sulfide compound ferrous sulfide, and
    (b) the pH of said solution being raised to around 4.5 to 5.5 prior to said treatment.

4. A process according to claim 1, further characterized by said enriched process solution initially being derived by
    (a) withdrawing a high pH slurry of sediment fines and associated sea water from a sea bottom area,
    (b) treating the slurry in the anode chamber of an electrolytic cell to derive a low pH treated slurry, and
    (c) separating the spent sediment fines from the treated slurry to provide an enriched process solution.

5. A process according to claim 4, further characterized by
    (a) after reacting said solution with said oxidizing agent, the pH of the reacted solution being raised by the addition thereto of raw slurry and the subsequent separation therefrom of the solid component of said raw slurry.

6. A process according to claim 5, further characterized by
    (a) the raw slurry addition being made prior to separation of the precipitate, and
    (b) said precipitate and solid component being moved together.

7. A process according to claim 6, further characterized by
    (a) said precipitate and solid component being mixed with raw slurry to form a process slurry, and
    (b) said process slurry forming the feed material to said anode chamber.

8. A process according to claim 1, further characterized by
    (a) said solution being substantially reacted with potassium permanganate.

9. A process for deriving precious metals from sea bottom environments, which comprises
    (a) forming a process slurry of material predominantly including sea water and bottom sediment fines,
    (b) electrolytically treating said process slurry in the anode chamber of an electrolytic cell,
    (c) deriving a filtrate from the electrolytically treated slurry at a pH significantly below 4.5, (d) reacting said filtrate with an oxidizing material having highly oxidizing properties characteristic of KMnO$_4$ to selectively derive a precipitate of interfering material,
(e) separating the precipitate from the reacted filtrate,
(f) introducing precious metal adsorptive particles into the separated filtrate, and
(g) separating the particles from said filtrate.

10. The process of claim 9, further characterized by
(a) said adsorptive particles comprising adsorptive ferrous sulfide,
(b) the pH of the reacted filtrate being raised subsequent to the reaction with said oxidizing material to the range of about 4.5 to 5.5.

11. The process of claim 10, further characterized by
(a) the pH of said filtrate being raised by the addition thereto of raw slurry, and
(b) the solid component of said slurry is separated from the pH-adjusted filtrate, recycled, and mixed with raw slurry to provide process slurry.

12. The process of claim 11, further characterized by
(a) the separated precipitate of interfering material is recycled with said solid component.

13. The process of claim 9, further characterized by
(a) said adsorptive particles comprising adsorptive sulfides of the group consisting of ferrous sulfide, manganese sulfide and zinc sulfide.

14. A process for preparing a sea water slurry containing precious metal compounds and interfering substances for the subsequent recovery of precious metals in elemental form comprising
(a) lowering the pH of the sea water slurry to below about 4.5,
(b) treating the sea water slurry with a highly active oxidizing agent having the oxidizing characteristics of KMnO$_4$,
(c) said treating step including a reaction between said oxidizing agent and said interfering substances to form an insoluble reaction product, and
(d) separating the reaction product from the sea water slurry.

15. The process of claim 14, wherein
(a) the pH of said sea water slurry is lowered to about 1 or less.

16. The process of claim 15, wherein
(a) the pH of said sea water slurry is raised to about 4.5, subsequent to said treating step, by adding raw sea water slurry thereto.

References Cited

UNITED STATES PATENTS

| | | | |
|---|---|---|---|
| 738,758 | 9/1903 | Baxeres de Alzugaray | 75—101 |
| 2,144,743 | 1/1939 | Schulz | 299—8 |
| 2,223,832 | 12/1940 | Rulison | 75—109 |

FOREIGN PATENTS

| | | |
|---|---|---|
| 14,097 | 7/1900 | Great Britain. |

JOHN H. MACK, Primary Examiner

A. C. PRESCOTT, Assistant Examiner

U.S. Cl. X.R.

75—108, 118; 204—109, 130, 152